United States Patent [19]

Takano

[11] Patent Number: 5,608,444
[45] Date of Patent: Mar. 4, 1997

[54] IMAGE SCANNING/RECORDING APPARATUS AND METHOD

[75] Inventor: Shunsuke Takano, Tokyo, Japan

[73] Assignee: Minnesota Mining and Manufacturing Company, St. Paul, Minn.

[21] Appl. No.: 257,717

[22] Filed: Jun. 10, 1994

[51] Int. Cl.$^6$ ....................................................... B41J 2/47
[52] U.S. Cl. .......................................... 347/259; 347/243
[58] Field of Search ...................................... 347/243, 259, 347/260

[56] References Cited

U.S. PATENT DOCUMENTS

| | | | |
|---|---|---|---|
| Re. 29,670 | 6/1978 | Spaulding | 359/331 |
| 4,321,564 | 3/1982 | Tregay | 332/7.51 |
| 4,696,061 | 9/1987 | Labrum | 359/162 |
| 4,896,169 | 1/1990 | Kuwabara et al. | 346/108 |
| 4,975,717 | 12/1990 | Takemoto et al. | 346/108 |
| 5,170,181 | 12/1992 | Tamada | 346/108 |

FOREIGN PATENT DOCUMENTS

| | | | |
|---|---|---|---|
| 0299455 | 1/1989 | European Pat. Off. | H04N 1/036 |
| 0347805 | 12/1989 | European Pat. Off. | H04N 1/18 |
| 1-237615 | 9/1989 | Japan | G02B 26/10 |

*Primary Examiner*—Mark J. Reinhart
*Attorney, Agent, or Firm*—Carolyn A. Bates; Steven J. Shumaker

[57] ABSTRACT

An image recording apparatus and method use an acoustooptic element as a shutter element and as a device to scan two different beams. The beams are diffracted by modulating the acoustooptic frequency of the acoustooptic element to form band-shaped spot rows on a moving image recording medium. The spot rows include a first beam row and a second beam row that are incident on the image recording medium at different times. The positions of the adjacent beam spots of the first beam row are adjusted relative to the positions of the adjacent beam spots of the second beam row.

5 Claims, 2 Drawing Sheets

IMAGE SCANNING/RECORDING APPARATUS AND METHOD

BACKGROUND OF THE INVENTION

1. Field of the Invention

The present invention relates to an image scanning/recording apparatus and method for forming a continuous band-shaped image of a uniform width by simultaneously applying a plurality of beams to a medium to be exposed.

2. Description of the Related Arts

A high speed recording is one of the important characteristics required for an image recording apparatus such as a laser printer. In order to accomplish a high speed recording, it is conceivable to carry out method of exposing a plurality of beams simultaneously. As one of methods for obtaining a plurality of beams, an apparatus includes a beam splitter which divides a beam into a plurality of beams by utilizing reflections of a plurality of glass plate surfaces having a plurality of surfaces parallel with a laser light source. The intensities of beams divided by the beam splitter are not equal to each other. Accordingly, it is preferable to modulate the optical intensities of beams in Switching Spots. The rise time of an optical shutter should be less than 1μsec for forming an image at a high speed.

An acoustooptic element is utilized as an optical-modulating element having the function of adjusting the optical intensities of a plurality of beams and allowing the optical shutter to rise at a high speed. A multichannel-applicable acoustooptic element can be used to independently modulate beams generated by the beam splitter. The acoustooptic element utilizes the phenomenon of Bragg diffraction which is caused by a diffraction grating generated by an acoustic wave in a material thereof. The diffraction angle of a beam is determined by a diffraction grating interval and wavelength of the beam. The diffraction grating interval is determined by the speed of an acoustic wave in an acoustooptic material and the frequency thereof. Accordingly, supposing that the wavelength of light incident on the acoustooptic element is constant, the diffraction angle of the light depends on the frequency of the acoustic wave applied to the acoustooptic material. The acoustooptic element used in a conventional image scanning/recording apparatus such as a laser printer functions only as an optical shutter but may be regarded as having a scanning function.

When divided beams of single natural light emitted by a laser light source or light linearly polarized in one direction and emitted by a laser are superimposed on each other, a clear spot image is not formed on a medium to be exposed due to the interference of beams. That is, if a continuous band-shaped scanning line is recorded by using such beams, interference fringes appear in the spot image. As a result, light and dark irregularities appear periodically in a band-shaped recorded pattern. Accordingly, divided beams of natural light or divided beams of light linearly polarized in one direction cannot be superimposed on each other. That is, in order to form an image by natural light having a high intensity, it is necessary to adopt a exposing/scanning method of generating a plurality of beams sequentially in exposure of a medium to the beams.

As described in Japanese Laid-Open Patent Publication No. 1-237615, in a conventional method for scanning/recording an image, beams linearly polarized at a right angle with each other are used to eliminate the effect of interference between adjacent beams. FIG. 3 shows an apparatus, for carrying out the method, disclosed in the above Patent Publication. A laser beam emitted by a gas laser 21 is divided into two kinds of beams, i.e. a change-direction beam and a straight-ahead beam, by a beam splitter 22. A beam reflected approximately 90° by the beam splitter 22 with respect to a beam which has linearly passed through the beam splitter 22 is incident on a polarization beam splitter 27 via a beam splitter 31, a mirror 26, and an acoustooptic element 25. The beam splitter 31 divides a beam into a plurality of parallel beams. The acoustooptic element 25 modulates a plurality of parallel beams independently, thus emitting a recording beam row to be used to record an image. The beam which has passed through the beam splitter 22 linearly is incident on the polarization beam splitter 27 via a beam shifter 23, a beam splitter 24, an acoustooptic element 25, and a mirror 26. The beam splitter 24 and the acoustooptic element 25 have the same functions as those elements 24 and 25, respectively. The two kinds of beams which have been incident on the polarization beam splitter 27 are condensed by a lens 28, thus forming four spots 30a, 30b, 30a, and 30b on a medium 29 to be exposed. A beam which forms the spot 30a and a beam which forms the spot 30b are different from each other in the direction of polarization plane thereof. According to this method, since the beams are linearly polarized, only less than 50% of the output power of natural light emitted from the laser light source is used to record an image on the medium. In addition, one multichannel-applicable acoustooptic element 25 is required to generate each of the two kinds of beams which are incident on the polarization beam splitter 27. Therefore, two multichannel-applicable acoustooptic elements 25 are required.

SUMMARY OF THE INVENTION

It is an object of the present invention to provide an image scanning/recording apparatus and method capable of exposing a medium to be exposed to a plurality of beams to form a continuous band-shaped image of a uniform width without generating interference between beams.

In accomplishing these and other objects, in addition to the function of an acoustooptic element, namely, the function as a shutter element for scanning one beam spot, the acoustooptic element is used as an element for scanning two kinds of beam spots. That is, by utilizing the fact that the diffraction direction of the acoustooptic element depends on an acoustooptic frequency, the diffraction directions of diffracted beams are varied from each other by modulating the acoustooptic frequency of the acoustooptic element. In this manner, band-shaped spot rows are formed on a medium in combination of a first beam row and a second beam row which are incident on the medium at different times, with the positions of the adjacent beam spots of the first beam row differentiated from the positions of the adjacent beam spots of the second beam row. As a result, a clear continuous image of an approximately uniform width can be formed by using natural light having a high intensity.

According to the above-described construction, acoustic waves of two different frequencies are alternately applied to the acoustooptic element so that the first and second beam rows are alternately generated. Therefore, no interference occurs between the spot row of the first beam row and that of the second beam row adjacent to each other on the drum. In addition, the positions of the adjacent spots of the first beam row is differentiated from the positions of the adjacent spots of the second beam row so that the adjacent spot rows are formed by the first and second beam rows, respectively on the drum by overlapping with each other. In this manner, a continuous band-shaped image of a uniform width can be formed on the drum. Therefore, it is not necessary to use linearly polarized light which becomes low in its intensity but natural light can be used in forming the continuous band-shaped image. Further, only one multichannel-applicable acoustooptic element is enough for the apparatus to function properly, and thus the apparatus has a simpler construction unlike the conventional apparatus as disclosed in Japanese Laid-Open Patent Publication No. 1-237615.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
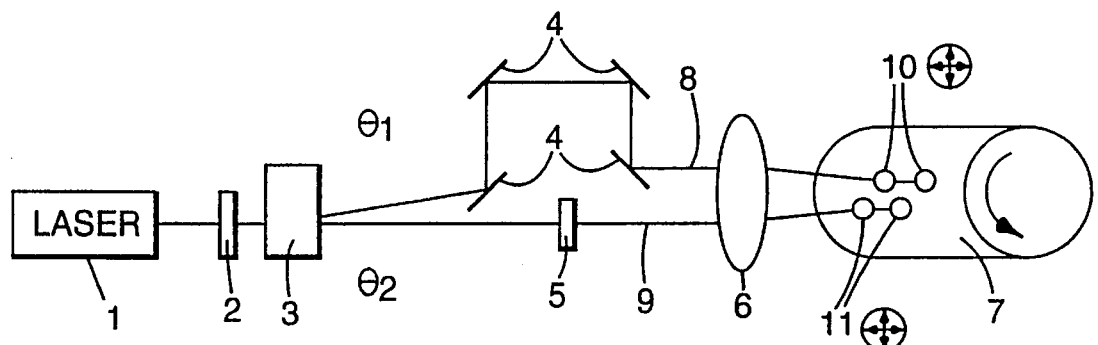
FIG. 1 is a schematic view showing an image scanning/recording apparatus according to an embodiment of the present invention.
Figure 3:
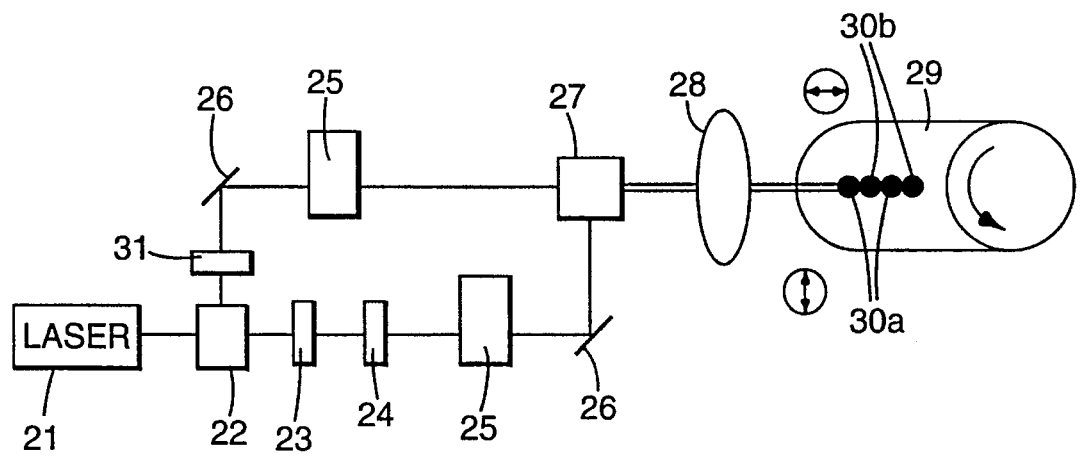
FIG. 3 is a schematic view showing a conventional image recording apparatus.

Before the description of the present invention proceeds, it is to be noted that like parts are designated by like reference numerals throughout the accompanying drawings.

Figure 2A:
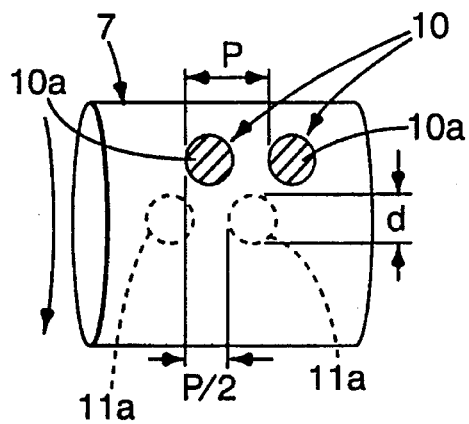
FIG. 2(A) is a view showing a first spot row formed by a beam on a drum to be exposed during the exposure.
Figure 2B:
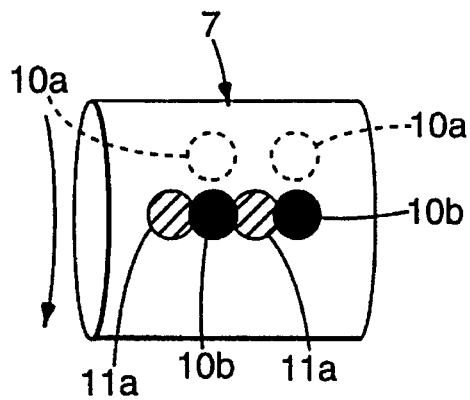
FIG. 2(B) is a view showing a second spot row being formed by a beam so that the spot image of the second spot row overlaps a spot image of the first spot row on the drum after the exposure.
Figure 2C:
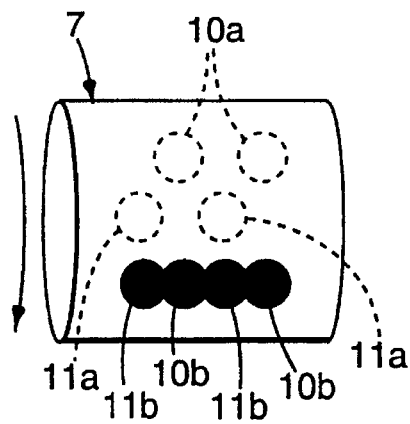
FIG. 2(C) is a view showing an approximately band-shaped image formed by the spot image of the first spot row and that of the second spot row.

An image scanning/recording apparatus and method according to an embodiment of the present invention is described below with reference to FIGS. 1 and 2.

The image recording apparatus for carrying out the method includes a gas laser 1; a beam splitter 2; an acoustooptic element 3; four mirrors 4; a beam shifter 5; and a lens 6. A laser beam emitted by the gas laser 1 is divided into two kinds of beam rows 8 and 9 via the beam splitter 2 and the acoustooptic element 3. The two kinds of beam rows 8 and 9 are incident on a drum 7 to be exposed, thus forming two kinds of spot rows 10 and 11 thereon, respectively. That is, in addition to the acoustooptic element 3, the apparatus is constructed to include the beam splitter 2 and the lens 6 which serves as an optical element for applying the beam rows 8 and 9 parallel with each other to the drum 7 so that a plurality of beams are simultaneously incident on the drum 7 to form spot images thereon.

The beam splitter 2 divides a laser beam, emitted by the gas laser 1, having high intensity and linearity into a plurality of beams. The resulted beam rows 8 and 9 of natural light adjacent to each other in such a degree as not to interfere are incident on the multichannel-applicable acoustooptic element 3. The acoustooptic element 3 generates at least two kinds of primary diffracted beams by application of either of two kinds of acoustic wave frequencies of f1 and f2. Let it be supposed that the directions of the two kinds of primary diffracted beams, corresponding to the frequencies f1 and f2, which have passed through the acoustooptic element 3 are θ1 and θ2, respectively. The primary diffracted beam row traveling in the direction of θ1 is denoted as a first beam row 8, and the primary diffracted beam row traveling in the direction of θ2 is denoted as a second beam row 9. That is, the acoustooptic element 3 generates the first and second beam rows 8 and 9 in response to the application of the two kinds of acoustic wave frequencies.

The first beam row 8 is incident on the drum 7 at positions 10a of the first spot row 10 via the four mirrors 4 and the lens 6. As shown in FIG. 1, the second beam row 9 is not incident on the mirrors 4, but passes through the beam shifter 5 and the lens 6, thus being incident on the drum 7 at positions 11a of the second spot row 11. As shown in FIG. 2 (A), the bean shifter 5 disposed between the acoustooptic element 3 and the lens 6 shifts the position 11a of the second spot row 11 by ½ of the interval (P) between adjacent positions 10a and 10a of the first spot row 10 with respect to the position 10a in the beam row direction. As shown in FIG. 2 (A), the position 10a of the first spot row 10 formed by the first beam row 8 which are to be incident on the drum 7 can be adjusted depending on the positions and the angles of the mirrors 4. That is, the position 10a of the first spot row 10 and the position 11a of the second spot row 11 are adjusted so that the first beam row 8 is incident on the drum 7 in parallel with the second beam row 9 and spaced a predetermined interval (d) therefrom in the rotational direction of the drum 7. The lens 6 condenses the first and second beam rows 8 and 9 so that each of the first and second beam rows 8 and 9 forms a spot image of a predetermined size on the drum 7. In this construction, as shown in FIGS. 2 (B) and 2 (C), the spot images 10b formed by the first beam row 8 are partially overlapped with the spot images 11b formed by the second beam row 9 due to the rotation of the drum 7. In this manner, the spot image 11b is interposed between the spot images 10b, thus forming an image of an approximately band-shaped configuration.

In the apparatus having the above-described construction, upon alternate applications of acoustic wave frequencies of f1 and f2 to the acoustooptic element 3, the first beam row 8 and the second beam row 9 are alternately generated, thus forming the first spot row 10 and the second spot row 11 on the drum 7 alternately. The modulation timing of the acoustic wave frequencies, namely, the timing to switch the frequency from the frequency f1 to the frequency f2 and from f2 to f1, the interval (d) between the centers of the first and second spot rows 10 and 11, and the rotational speed of the drum 7 are optimized depending on the intensity of the beam (spot) and the sensitivity of the medium (drum 7) to be exposed to the first and second beam rows 8 and 9. In this embodiment, the first spot rows 10 are formed by the first beam row 8 at the positions 10a on the drum 7 as shown in FIG. 2 (A). Then, the second spot rows 11 are formed by the second beam row 9 at the positions 11a on the drum 7 as shown in FIG. 2 (B). As a result, as shown in FIG. 2 (C), an image of a continuous band-shaped configuration of a uniform width is formed on the drum 7 in combination of the spot images 10b of the first spot row 10 and the spot images 11b of the second spot row 11. In this image formation, the first spot row 10 is formed by the first beam row 8 as shown in FIG. 2 (A), and then, the second spot row 11 is formed by the second beam row 9 as shown in FIG. 2 (B). That is, the spot rows 10 and 11 are formed by each of the first and second beam row 8 and 9 at different times and thus the beam spots do not interfere with each other.

In this embodiment, two different acoustic wave frequencies are alternately applied to the acoustooptic element 3 so that the first and second beam rows 8 and 9 are alternately generated in different timing. Therefore, no interferences occur between the spot rows 10 and 11 adjacent to each other on the drum 7. In addition, the positions of the adjacent spots 10 and 11 are differentiated from each other, so that the adjacent spot rows 10 and 11 are formed by the first and second beam rows 8 and 9, respectively on the drum 7 while overlapping each other. In this manner, a continuous band-shaped image of a uniform width can be formed on the drum 7. Therefore, it is not necessary to use linearly polarized light which becomes low in its intensity, but natural light can be used for forming the continuous band-shaped image. Further, only one multi-channel-applicable acoustooptic element 3 is enough for the apparatus to function properly, and thus the apparatus has a simpler construction unlike the conventional apparatus as disclosed in Japanese Laid-Open Patent Publication No. 1-237615.

The image scanning/recording apparatus and method according to the present invention can be embodied in various aspects.

For example, in the embodiment, the drum 7 is exposed to beams at two positions thereof, but at a desired number of positions to obtain a band-shaped image of a predetermined length. The beam shifter 5 is provided to differentiate the positions of the adjacent spots of the first and second beam rows 8 and 9 from each other. Therefore, the beam shifter 5 may be disposed on the optical path of the first beam row 8, not on the optical path of the second beam row 9. The number of the lens 6 provided in the embodiment is only one, but two lenses 6 may be provided so that one of the lenses 6 condenses the first beam row 8 and the other lens 6 condenses the second beam row 9.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image recording apparatus comprising:

a laser beam emitting device for generating a first beam and a second beam;

an acoustooptic element oriented to receive the first beam and the second beam from the laser beam emitting device, the acoustooptic element generating at different times a first beam row with the first beam in response to application of a first acoustic wave frequency to the acoustooptic element and a second beam row with the second beam in response to application of a second acoustic wave frequency to the acoustooptic element, the first beam row and second beam row being produced as primary diffracted beams which are diffracted in different directions by the acoustooptic element in response to the first and second acoustic wave frequencies;

a beam shifter oriented to receive the primary diffracted beams produced by the acoustooptic element, the beam shifter adjusting positions of adjacent beam spots of the first beam row and the second beam row relative to one another; and an optical system for allowing the first and second beam rows to be incident on a moving image recording medium to be exposed so that spot images formed on the image recording medium by the second beam row partially overlap spot images formed on the image recording medium by the first beam row due to movement of the image recording medium.

2. The image recording apparatus as claimed in claim 1, wherein the optical system comprises:

a mirror for reflecting the first beam row generated by the acoustooptic element, thus adjusting an incident position of the first beam row on the medium;

a first condensing lens for condensing the first beam row reflected by the mirror, thus allowing the first beam row to be incident on the medium; and a second condensing lens for condensing the second beam row, thus allowing the second beam row to be incident on the medium.

3. The image recording apparatus as claimed in claim 1, wherein the laser beam emitting device comprises a laser, and a beam splitter for dividing a laser beam generated by the gas laser into the first and second beams.

4. The image recording apparatus as claimed in claim 2, wherein the laser beam emitting device comprises a laser, and a beam splitter for dividing a laser beam generated by the gas laser into the first and second beams.

5. An image recording method comprising the steps of:

generating a first beam and a second beam;

generating by means of an acoustooptic element a first beam row from the first beam in response to a first acoustic wave frequency applied to the acoustoopic element and a second beam row from the second beam in response to a second acoustic wave frequency applied to the acousteoptic element at different times, the first beam row and second beam row being produced as primary diffracted beams which are diffracted in different directions by the acoustooptical element in response to the first and second acoustic wave frequencies;

adjusting positions of adjacent spots of the first beam row and the second beam row relative to one another; and allowing the first and second beam rows to be incident on a moving image recording medium to be exposed so that spot images formed on the image recording medium by the second beam row overlap spot images formed on the image recording medium by the first beam row due to movement of the image recording medium.

* * * * *